United States Patent
Kotrla et al.

(10) Patent No.: US 8,159,968 B2
(45) Date of Patent: Apr. 17, 2012

(54) MEASURING ENCAPSULATION OVERHEAD AND TRANSPORT BANDWIDTH IN FRAME-BASED TRANSPORT

(75) Inventors: Scott R. Kotrla, Wylie, TX (US); Matthew W. Turlington, Richardson, TX (US); Michael U. Bencheck, Richardson, TX (US)

(73) Assignee: Verizon Patent and Licensing, Inc., Basking Ridge, NJ (US)

( * ) Notice: Subject to any disclaimer, the term of this patent is extended or adjusted under 35 U.S.C. 154(b) by 308 days.

(21) Appl. No.: 12/633,035

(22) Filed: Dec. 8, 2009

(65) Prior Publication Data
US 2011/0134767 A1 Jun. 9, 2011

(51) Int. Cl.
G06F 11/00 (2006.01)
(52) U.S. Cl. ........................................ 370/252; 370/468
(58) Field of Classification Search .................. 370/252, 370/253, 464, 465, 468
See application file for complete search history.

(56) References Cited

U.S. PATENT DOCUMENTS

| | | | | |
|---|---|---|---|---|
| 6,469,986 | B1* | 10/2002 | Lecheler et al. | 370/252 |
| 7,489,630 | B2* | 2/2009 | Watkinson | 370/230 |
| 2002/0093948 | A1* | 7/2002 | Dertz et al. | 370/355 |
| 2010/0130241 | A1* | 5/2010 | Kitaji | 455/509 |

* cited by examiner

Primary Examiner — Luat Phung (57) ABSTRACT

A system measures, at a network device, a first frame rate of frame-based transport based on a first frame size, and measures, at the network device, a second frame rate of the frame-based transport based on a second frame size, where the second frame size is different than the first frame size. The system determines per frame encapsulation overhead in the frame-based transport using the first frame rate, the first frame size, the second frame rate, and the second frame size. The system further determines total transport bandwidth associated with the frame-based transport using the first frame rate, the first frame size, the second frame rate, the second frame size, and the determined per frame encapsulation overhead.

18 Claims, 5 Drawing Sheets

MEASURING ENCAPSULATION OVERHEAD AND TRANSPORT BANDWIDTH IN FRAME-BASED TRANSPORT

BACKGROUND

Frames are digital data transmission units that may be used in a link layer protocol for data exchange between two network nodes via a physical link or a logical link. A frame may consist of a link-layer header followed by a packet. Frame-based transport involves using frames to transport data from one network node to another network node. Various frame-based protocols may be used to implement frame-based transport, including Ethernet, Generic Frame Protocol (GFP), Multi-Protocol Label Switching (MPLS), etc. In service provider networks, encapsulation of one frame-based protocol into another frame-based protocol is very common (e.g., Ethernet into GFP, Ethernet into MPLS, Ethernet into Provider Backbone Bridging (PBB)), and may add a significant per frame encapsulation overhead to the frame-based transport.

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

Exemplary embodiments described herein implement a measuring unit or device that may measure per frame encapsulation overhead and total transport bandwidth associated with frame-based transport that occurs at, or between, transport equipment (e.g., routers or switches). The measuring unit or device, described herein, may use measurements of frame throughput (i.e., frame rate) at multiple different frame sizes to determine the per frame encapsulation overhead and the total transport bandwidth of the frame-based transport. The per frame encapsulation overhead may be determined based on a functional relationship between the multiple different frame sizes, and the different measurements of the frame throughput. The total transport bandwidth may be determined based on a functional relationship between the multiple different frame sizes, the different measurements of the frame throughput, and the determined per frame encapsulation overhead. The determined per frame encapsulation overhead and total transport bandwidth may be useful for analyzing any type of transport equipment that performs frame-based encapsulation, especially in a multi-vendor environment for interoperability analysis (e.g., where certain pairs of different vendor's transport equipment may not work together).

Figure 1:
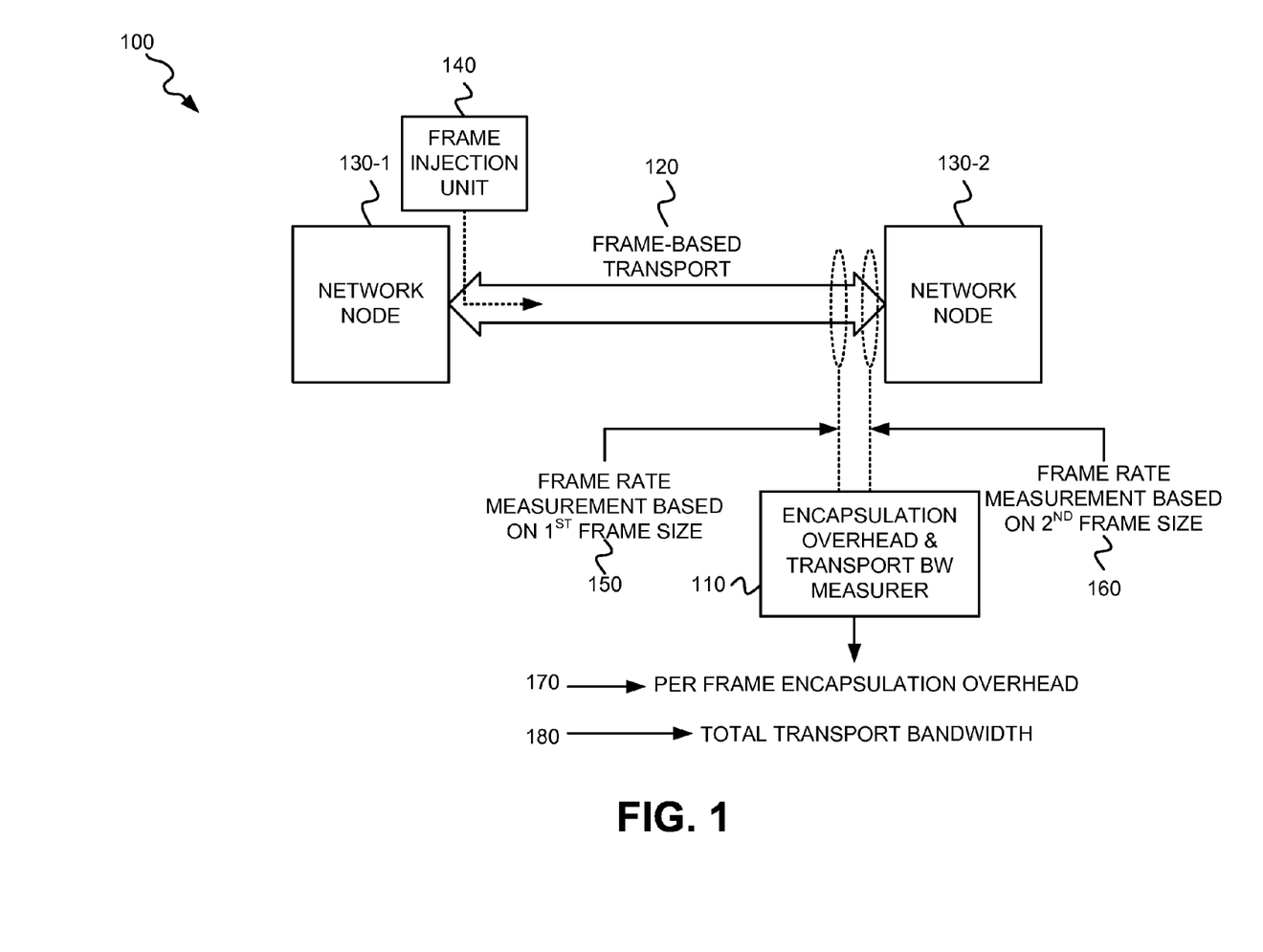
FIG. 1 is a diagram of an overview of measuring encapsulation overhead and transport bandwidth in frame-based transport according to an exemplary embodiment.

FIG. 1 is a diagram of an overview of the measurement of encapsulation overhead and transport bandwidth in frame-based transport according to an exemplary embodiment. As shown in FIG. 1, an encapsulation overhead and transport bandwidth (BW) measurer 110 may perform measurements with respect to frame-based transport 120 that is occurring between a first network node 130-1 and another network node 130-2 (generically referred to herein as "network node 130") to determine per frame encapsulation overhead and total transport bandwidth associated with frame-based transport 120. Encapsulation overhead and transport BW measurer 110 may be implemented at network node 130-1 or network node 130-2, or at some intermediate node between network nodes 130-1 and 130-2 (FIG. 1 depicts measurer 110 implemented at network node 130-2 by way of example). Frame-based transport 120 may occur over a single link or over multiple links between network node 130-1 and network node 130-2. Network node 130 may include any type of node that may transmit and/or receive frames using frame-based transport. For example, network node 130 may include a bridge, a router, a network hub, Synchronous Optical Networking (SONET) transport equipment, or a switch. In one implementation, network node 130 may include a Multi-Protocol Label Switching (MPLS) switch. Frame-based transport 120 may occur as a result of frames injected by frame injection unit 140 at a maximum frame rate. The maximum frame rate is the rate that frames can be transmitted between network node 130-1 and 130-2 without packet loss occurring. For example, if frame injection unit 140 injects frames at 80,000 frames per second (fps) and packet loss occurs, but if frame injection unit 140 injects frames at 79,999 fps and no packet loss occurs, then 79,999 fps is the maximum frame rate. Frame injection unit 140 may be implemented at network node 130-1 or network node 130-2, or at some intermediate node between network nodes 130-1 and 130-2 (FIG. 1 depicts frame injection unit 140 implemented at network node 130-1 by way of example)

When frame-based transport 120 occurs between network node 130-1 and network node 130-2, encapsulation overhead and transport BW measurer 110 may perform a first frame rate measurement 150 based on a first frame size. Frame injection unit 140 injects frames into the network at the first frame size. For example, measurer 110 may assume a frame size of 68 bytes (i.e., frame injection unit 140 is known to be injecting Ethernet frames of 68 bytes in size), and may count a number of 68 byte frames that are transmitted in frame-based transport 120 in a given period of time (e.g., one second). Simultaneously, measurer 110 may perform a second frame rate measurement 160 based on a second frame size. Frame injection unit 140 injects frames into the network at the second frame size. For example, measurer 110 may assume a frame size of 1,522 bytes (i.e., frame injection unit 140 is known to be injecting Ethernet frames of 1,522 bytes in size), and may count a number of 1,522 byte frames that are transmitted in frame-based transport 120 in the given period of time.

Encapsulation overhead and transport bandwidth measurer 110 may then determine the per frame encapsulation overhead 170 associated with frame-based transport 120 based on the first frame size, frame rate measurement 150, the second frame size, and frame rate measurement 160. For example, as described in further detail below, measurer 110 may use a functional relationship between the first frame size, frame rate measurement 150, the second frame size, and frame rate measurement 160 to determine per frame encapsulation overhead 170. Encapsulation overhead and transport BW measurer 110 may also determine the total transport bandwidth associated with frame-based transport 120 based on the first frame size, frame rate measurement 150, the second frame size, frame rate measurement 160, and per-frame encapsulation overhead 170. For example, as described below, measurer 110 may use a functional relationship between the first frame size, frame rate measurement 150, the second frame size, frame rate measurement 160, and per-frame encapsulation overhead 170 to determine total transport bandwidth 180.

The exemplary embodiment of FIG. 1 may be implemented in a lab environment during interoperability testing (i.e., testing the interoperability of different network nodes), may be implemented manually using test equipment that can generate frame-based traffic with the per frame encapsulation overhead and total transport bandwidth determinations being performed offline, or may be implemented as an automated script(s) built into test equipment, or network node 130, that may automatically perform accurate frame rate measurements at multiple frame sizes and may display the determined per frame encapsulation overhead and total transport bandwidth.

Figure 2:
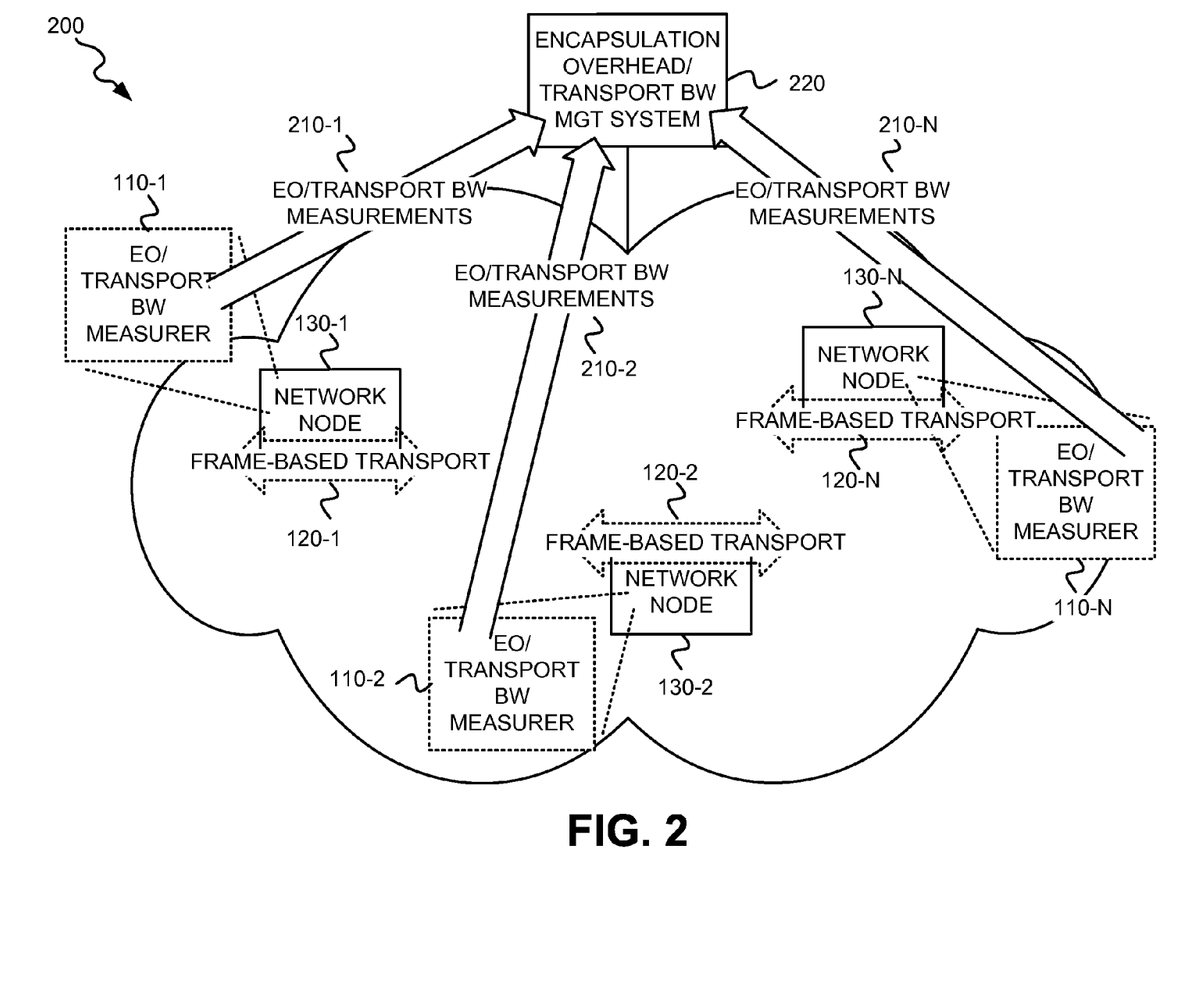
FIG. 2 is a diagram that depicts an exemplary embodiment where encapsulation overhead and transport bandwidth measurements, performed at network nodes in a network, are reported to a central management system.

FIG. 2 is a diagram that depicts an exemplary embodiment in which encapsulation overhead and transport bandwidth measurements, performed at network nodes in a network 200, are reported to a central management system (e.g., associated with a network administrator). As depicted in FIG. 2, multiple encapsulation overhead (EO) and transport BW measurers 110-1 through 110-N (where N may be any integer), associated with respective network nodes 130-1 through 130-N, may report EO/transport bandwidth measurements 210-1 through 210-N to an encapsulation overhead/transport bandwidth management system 220. Encapsulation overhead/transport bandwidth management system 220 may store the reported measurements in a database (not shown) for retrieval and use in the managing of network 200 (e.g., for transport analysis).

Network 200 may include one or more networks, such as, for example, a local area network (LAN), a wide area network (WAN), a metropolitan area network (MAN), an intranet, the Internet, a wireless satellite network, a cable network (e.g., an optical cable network), and/or a wireless public land mobile network (PLMN).

Network 200 may include additional, fewer and/or different network components than those depicted in FIG. 2.

Figure 3:
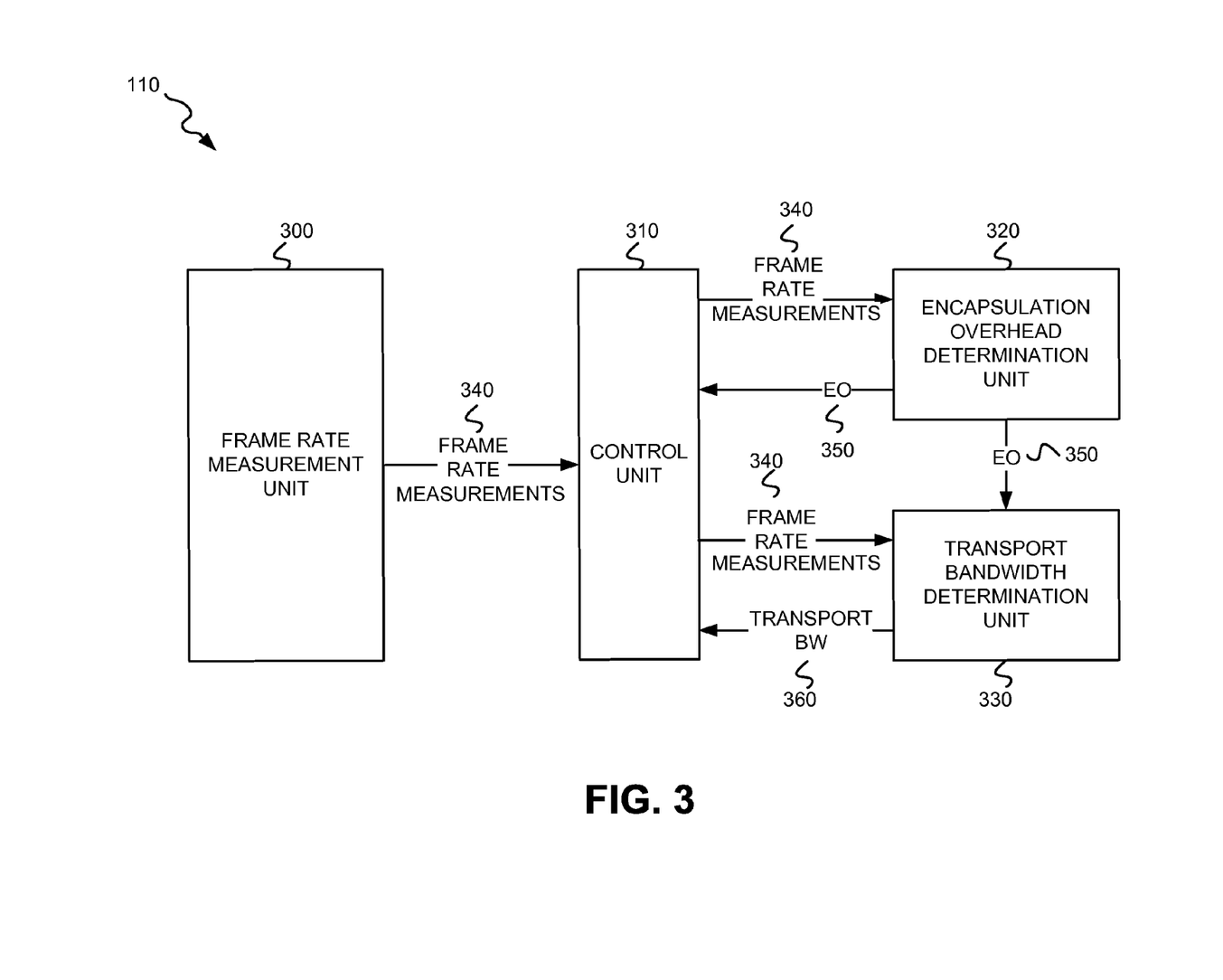
FIG. 3 is a diagram of functional components associated with the encapsulation overhead and transport bandwidth measurer(s) of FIGS. 1 and 2.

FIG. 3 is a diagram of functional components associated with the encapsulation overhead and transport bandwidth measurer(s) 110 of FIGS. 1 and 2. Measurer 110 may include a frame rate measurement unit 300, a control unit 310, an encapsulation overhead determination unit 320 and a transport bandwidth determination unit 330.

Frame rate measurement unit 300 may perform multiple frame rate measurements based on corresponding known or assumed frame sizes. For example, frame rate measurement unit 300 may perform a first frame rate measurement based on a known size of frames being injected by frame injection unit 140. For example, frame rate measurement unit 300 may assume a frame size of 68 bytes, and may count each increment of 68 bytes that is transmitted in the frame-based transport in a given period of time (e.g., one second). Each increment of 68 bytes may be counted as a 68 byte frame. Simultaneously, frame rate measurement unit 300 may perform a second frame rate measurement based on a known size of second frames being injected by frame injection unit 140, where the second frame size is different than the first frame size. For example, frame rate measurement unit 300 may assume a frame size of 1,522 bytes, and may count each increment of 1,522 bytes that is transmitted in the frame-based transport in the given period of time. Each increment of 1,522 bytes may be counted as a 1,522 byte frame. Frame rate measurement unit 300 may pass frame rate measurements 340 to control unit 310.

Control unit 310 may perform control functions for measurer 110. For example, control unit may pass frame rate measurements 340 to encapsulation overhead determination unit 320 and transport bandwidth determination unit 330. Control unit 310 may additionally receive the determined encapsulation overhead (EO) 350 from encapsulation overhead determination unit 320 and may also receive the determined transport bandwidth 360 from transport bandwidth determination unit 330. Control unit 310 may also provide the determined encapsulation overhead 350 and the transport bandwidth 360 to an external entity. In one embodiment, for example, control unit 310 may provide the EO 350 and transport BW 360 to encapsulation overhead/transport bandwidth management system 220, described above with respect to the embodiment of FIG. 2.

Encapsulation overhead determination unit 320 may determine a per frame encapsulation overhead associated with the frame-based transport based on the Eqn. (3) below. Eqn. (3) may be derived starting with Eqn. (1), which is an equation that determines a total transport bandwidth based on the frame size, encapsulation overhead, and frame rate of the frame-based transport:

$$(fs+encap\_overhead)*fr*8 = t\_bw \quad \text{Eqn. (1)}$$

where
fs is the frame size in bytes,
encap_overhead is the per frame encapsulation overhead,
fr is the frame rate in frames per second (fps), and
t_bw is the total transport bandwidth.

By performing frame rate measurements at two different frame sizes, and setting the total transport bandwidth associated with each of the two different frame sizes equal to one another (i.e., setting the left side of equation (1), where fs and fr are associated with the first frame size, equal to the left side of equation (1), where fs and fr are associated with the second frame size), as shown in Eqn. (2), the per frame encapsulation overhead can be solved.

$$(fs_1+encap\_overhead)*fr_1*8 = (fs_2+encap\_overhead)*fr_2*8 \quad \text{Eqn. (2)}$$

Solving Eqn. (2) for the per frame encapsulation overhead results in the following equation:

$$encap\_overhead = \frac{(fs_2 * fr_2 * 8) - (fs_1 * fr_1 * 8)}{(fr_1 * 8) - (fr_2 * 8)} \quad \text{Eqn. (3)}$$

where
encap_overhead is the per frame encapsulation overhead,
$fs_2$ is the second frame size in bytes,
$fr_2$ is the second frame rate in fps,
$fs_1$ is the first frame size in bytes, and
$fr_1$ is the first frame rate in fps.

Eqn. (3), thus, represents a functional relationship between the first frame size ($fs_1$), the first frame rate ($fr_1$), the second frame size ($fs_2$), the second frame rate ($fr_2$), and the per frame encapsulation overhead (encap_overhead). Eqn. (3) may be used by encapsulation overhead determination unit 320 to determine the per frame encapsulation overhead based on the assumed first frame size, the measured first frame rate, the assumed second frame size, and the measured second frame rate.

Transport bandwidth determination unit 330 may determine the total transport bandwidth of the frame-based transport using equation Eqn. (1) above, and either the first frame size and the first frame rate, or the second frame size and the second frame rate. Therefore, either of the values of the first frame size and the first frame rate, or the values of the second frame size and the second frame rate, may be inserted into Eqn. (1) to determine the total transport bandwidth (t_bw).

The functional components of measurer 110, described above, may be implemented in hardware, or in a combination of hardware and software. If implemented in software, at least some of the various functions of the functional components of measurer 110 may be stored as software instructions in a computer-readable medium, and then executed by a processing unit, such as, for example, a central processing unit (CPU). The computer-readable medium may be defined as a physical or logical memory device. A logical memory device may include memory space within a single physical memory device or spread across multiple physical memories.

Measurer 110 may include additional, fewer, different, and/or differently arranged components than those depicted in FIG. 2. Additionally, functions described as being performed by one component of measurer 110 may be performed by another, different component.

Figure 4:
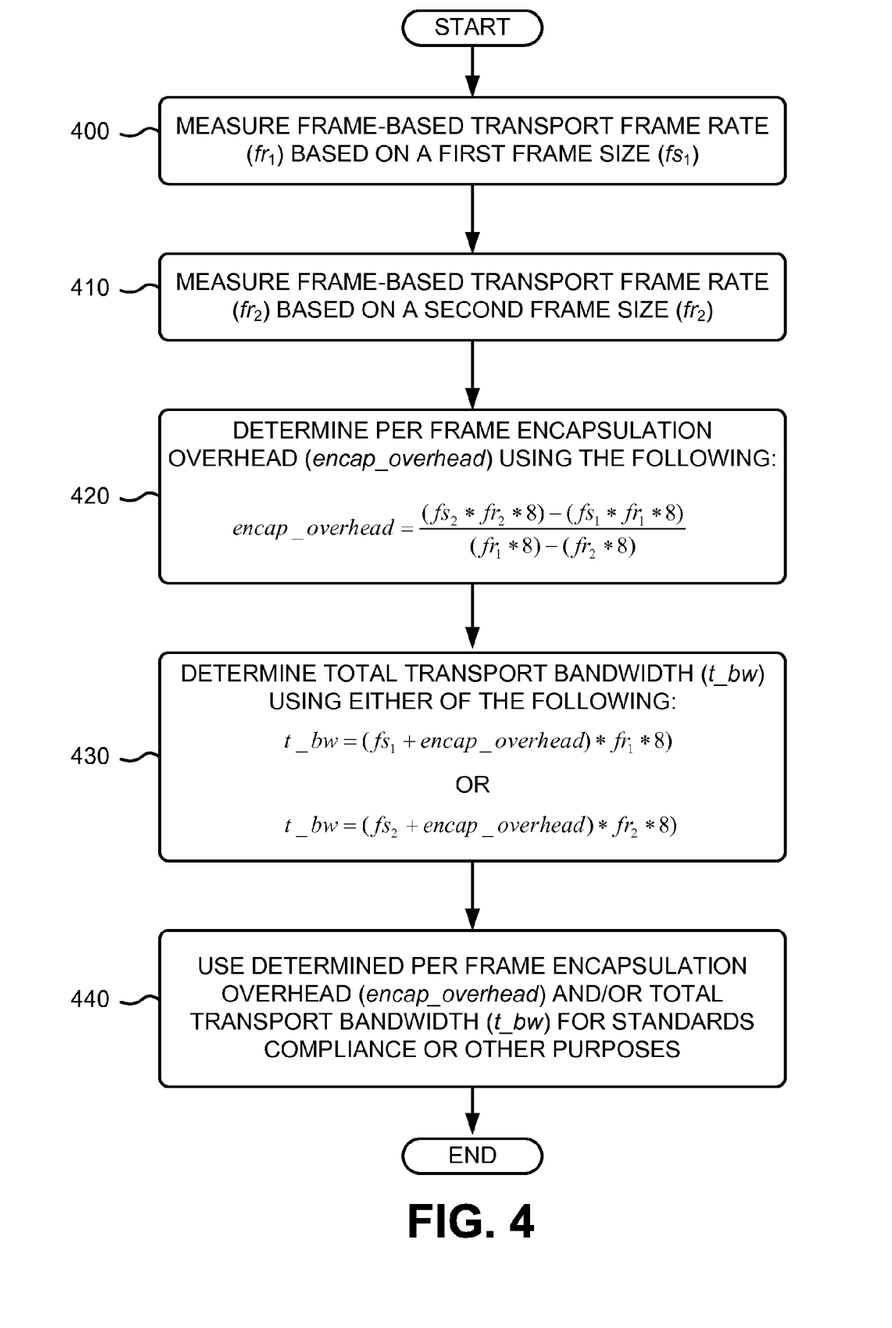
FIG. 4 is a flow diagram illustrating an exemplary process for measuring per frame encapsulation overhead and total transport bandwidth associated with frame-based transport.

FIG. 4 is a flow diagram illustrating an exemplary process for measuring per frame encapsulation overhead and total transport bandwidth associated with frame-based transport. The exemplary process may be performed by encapsulation overhead and transport bandwidth measurer 110. In other embodiments, the exemplary process of FIG. 4 may be performed by measurer 110 in conjunction with other devices, or by one or more other devices other than measurer 110. The exemplary process of FIG. 4 may be described below with reference to the specific example depicted in FIG. 5. In the exemplary process of FIG. 4, it is assumed that frame injection unit 140 injects frames of a known first size at a maximum frame rate during a first period of time (i.e., coinciding with block 400), and then injects frames of a known second size at a maximum frame rate during a second period of time (i.e., coinciding with block 410).

Figure 5:
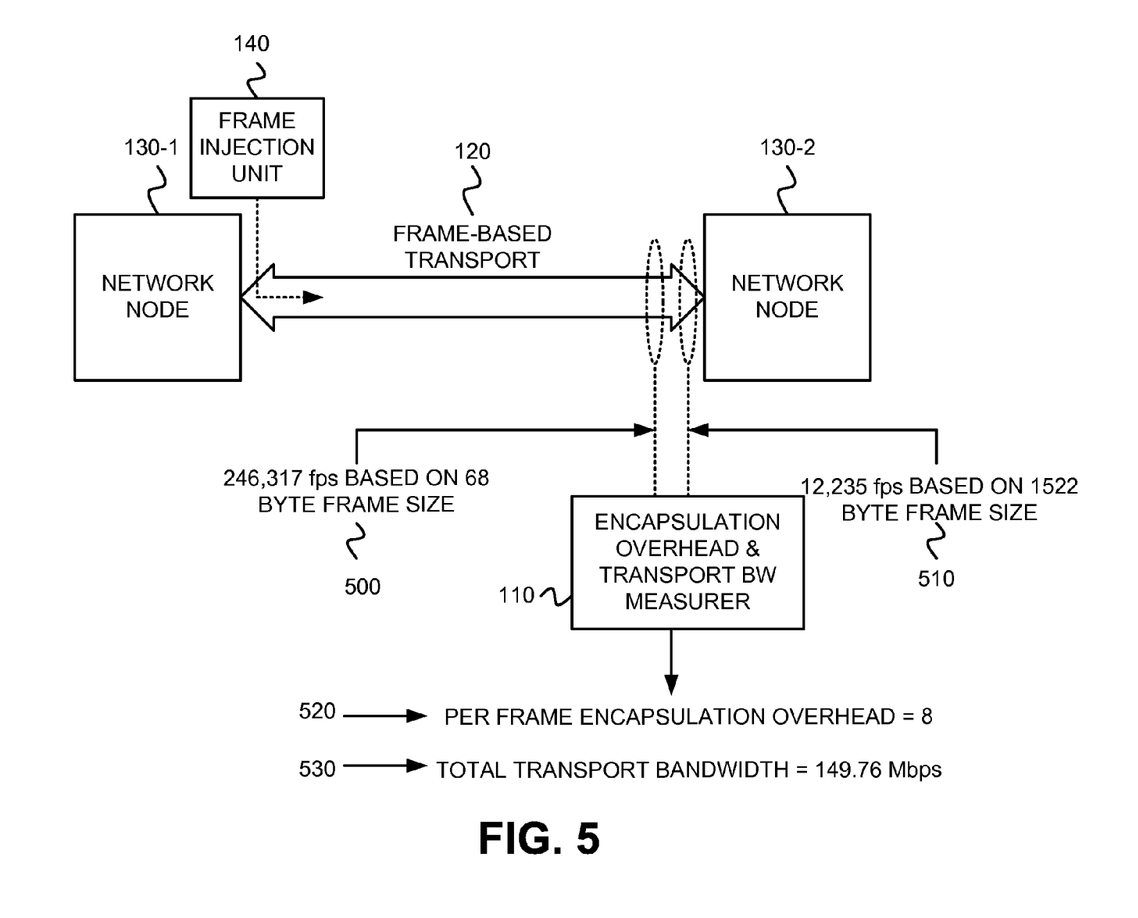
FIG. 5 is a diagram that depicts an example of the exemplary process of FIG. 4.

The exemplary process may include measuring a frame rate ($fr_1$) of the frame-based transport based on a first frame size ($fs_1$) (block 400). Frame injection unit 140 may inject test frames of a known first size at a maximum frame rate for measurement by measurer 110. Frame rate measurement unit 300 may assume a known first frame size ($fs_1$) (i.e., the known size of frames injected by frame injection unit 140) and may then count a number of frames, having the first frame size, that are transmitted in the frame-based transport in a given period of time (e.g., one second). The resulting frame rate ($fr_1$) may have units of frames per second (fps). For example, frame rate measurement unit 300 may assume a frame size of X bytes, and may count each increment of X bytes that is transmitted in the frame-based transport in a given period of time (e.g., one second). Each increment of the X bytes may be counted as an X byte frame. The first frame size ($fs_1$) may be selected based on knowledge of the frame size injected by frame injection unit 140. FIG. 5 depicts an example in which per frame encapsulation overhead and total transport bandwidth may be determined for a specific frame-based transport. In the example of FIG. 5, a first frame size of 68 bytes is assumed, and measurer 110 measures a first frame rate 500 of 246,317 fps.

A frame rate (fr2) of the frame-based transport may be measured based on a second frame size (fs2) (block 410). Frame injection unit 140 may inject test frames of a known second size at a maximum frame rate for measurement by measurer 110. Frame rate measurement unit 300 may assume a known second frame size ($fs_2$) (i.e., the known size of frames injected by frame injection unit 140) and may then count a number of frames, having the second frame size, that are transmitted in the frame-based transport in a given period of time (e.g., one second). The resulting second frame rate ($fr_2$) may have units of frames per second (fps). For example, frame rate measurement unit 300 may assume a frame size of Y bytes, and may count each increment of Y bytes that is transmitted in the frame-based transport in the given period of time. Each increment of the Y bytes may be counted as a Y byte frame. The second frame size ($fs_2$) may be selected based on knowledge of the frame size injected by frame injection unit 140. In the example of FIG. 5, a second frame size of 1,522 bytes is assumed, and measurer 110 measures a second frame rate 510 of 12,235 fps.

The encapsulation overhead (encap_overhead) may be determined using the relation specified in Eqn. (3) above (block 420):

$$\text{encap\_overhead} = \frac{(fs_2 * fr_2 * 8) - (fs_1 * fr_1 * 8)}{(fr_1 * 8) - (fr_2 * 8)}$$

where
encap_overhead is the per frame encapsulation overhead,
$fs_2$ is the second frame size in bytes,
$fr_2$ is the second frame rate in frames per second,
$fs_1$ is the first frame size in bytes, and
$fr_1$ is the first frame rate in frames per second.

As shown in the example of FIG. 5, measurer 110 may, based on an assumed 68 bytes frame size and a corresponding measured frame rate of 246,317 fps, and based on an assumed frame size of 1,522 bytes and a corresponding measured frame rate of 12,235 fps, determine a per frame encapsulation overhead 520 of 8 using Eqn. (3). The determined per frame encapsulation overhead may be stored in memory for future retrieval (e.g., to create a historical record of the per frame encapsulation overhead). In an embodiment in which measurer 110 is implemented in a network node (e.g., a switch), the network node may store the determined per frame encapsulation for remote retrieval (e.g., by management system 220, or by another device or entity).

The total transport bandwidth (t_bw) may be determined using either of the following relations (block 430):

$$t\_bw = (fs_1 + \text{encap\_overhead}) * fr_1 * 8) \qquad \text{Eqn. (4)}$$

or $$t\_bw = (fs_2 + \text{encap\_overhead}) * fr_2 * 8) \qquad \text{Eqn. (5)}$$

where t_bw is the total transport bandwidth.

As shown in the example of FIG. 5, measurer 110 may, based on a 68 byte frame size and a corresponding measured frame rate of 246,317 fps, the frame size of 1,522 bytes and a corresponding measured frame rate of 12,235 fps, and the determined encapsulation overhead of 8, determine a total transport bandwidth of 149.76 Mbps using Eqns. (4) or (5). The determined total transport bandwidth may be stored in memory for future retrieval (e.g., to create a historical record of the total transport bandwidth over time). In an embodiment in which measurer 110 is implemented in a network node (e.g., a switch), the network node may store the determined total transport bandwidth for remote retrieval (e.g., by management system 220, or by another device or entity).

The determined per frame encapsulation overhead (encap_overhead) and total transport bandwidth (t_bw) may be used for standards compliance or for other purposes (block 440). For example, the determined per frame encapsulation overhead and/or total transport bandwidth may be used to empirically determine whether optional fields are being used in the frame-based transport, how many GFP overhead bytes exist in a given frame-based transport, whether a GFP frame check sequence (FCS) is being used in the frame-based transport, whether GFP extensions are being used in the frame-based transport, whether Synchronous Transport Signal 1 (STS1) or Synchronous Transport Signal 3c (STS3c) based SONET Virtual Concatenation is being used in the frame-based transport, or whether a full SONET payload bandwidth is being used for the frame-based transport. As another example, the total transport bandwidth may be used to determine if adequate transport bandwidth exists to satisfy Service Level Agreement (SLA) or Quality of Service (QoS) requirements. As another example, the determined per frame encapsulation overhead and/or total transport bandwidth may be output to an entity (e.g., a network administrator) for further analysis.

Exemplary embodiments described herein implement a measuring unit or device that may determine per frame encapsulation overhead and total transport bandwidth associated with frame-based transport that occurs at, or between, transport equipment (e.g., routers, switches, or other network nodes). The determined per frame encapsulation overhead and total transport bandwidth may be useful for analyzing any type of transport equipment that performs frame-based encapsulation.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with regard to FIG. 4, the order of the blocks may be modified in other embodiments. Further, non-dependent blocks may be performed in parallel.

It will be apparent that embodiments, as described above, may be implemented in many different forms of software, firmware, and hardware in the implementations illustrated in the figures. The actual software code or specialized control hardware used to implement embodiments is not limiting of the invention. Thus, the operation and behavior of the embodiments have been described without reference to the specific software code, it being understood that software and control hardware may be designed based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
   measuring, at a network device, a first frame rate of frame-based transport based on a first frame size;
   measuring, at the network device, a second frame rate of the frame-based transport based on a second frame size, where the second frame size is different than the first frame size;
   determining per frame encapsulation overhead in the frame-based transport using the first frame rate, the first frame size, the second frame rate, and the second frame size,
   where determining per frame encapsulation overhead in the frame-based transport comprises using a function that includes:

$$\text{encap\_overhead} = \frac{(fs_2 * fr_2 * 8) - (fs_1 * fr_1 * 8)}{(fr_1 * 8) - (fr_2 * 8)}$$

where encap_overhead is the per frame encapsulation overhead,
   $fs_2$ is the second frame size in bytes,
   $fr_2$ is the second frame rate in frames per second,
   $fs_1$ is the first frame size in bytes, and
   $fr_1$ is the first frame rate in frames per second;
   determining total transport bandwidth associated with the frame-based transport using the first frame rate, the first frame size, the second frame rate, the second frame size, and the determined per frame encapsulation overhead; and
   outputting the determined per frame encapsulation overhead and/or the determined total transport bandwidth associated with the frame-based transport.

2. The method of claim 1, where the network device is a switch.

3. The method of claim 2, where the switch is a multiprotocol label switching (MPLS) switch.

4. The method of claim 1, further comprising:
   storing the determined per frame encapsulation and the total transport bandwidth at the network device.

5. The method of claim 4, further comprising:
   permitting remote access to the stored per frame encapsulation overhead and the total transport bandwidth from a remote device or entity.

6. The method of claim 1, further comprising:
   sending the determined per frame encapsulation overhead and the total transport bandwidth from the network device to a management system across a network.

7. The method of claim 1, where measuring the first frame rate of the frame-based transport comprises:
   counting a first number of frames that are the first frame size in a given period of time in the frame-based transport.

8. The method of claim 7, where measuring the second frame rate of the frame-based transport comprises:
   counting a second number of frames that are the second frame size in the given period of time in the frame-based transport.

9. The method of claim 8, where the given period of time is one second.

10. The method of claim 1, where determining the total transport bandwidth associated with the frame-based transport using the first frame rate, the first frame size, the second frame rate, the second frame size, and the encapsulation overhead comprises using the following:

$$t\_bw = (fs_1 + \text{encap\_overhead}) * fr_1 * 8,$$

where t_bw is the total transport bandwidth.

11. The method of claim 1, where determining the total transport bandwidth associated with the frame-based transport using the first frame rate, the first frame size, the second frame rate, the second frame size, and the encapsulation overhead comprises using the following:

$$t\_bw = (fs_2 + encap\_overhead) * fr_2 * 8),$$

where t_bw is the total transport bandwidth.

12. A network device, comprising:
a frame rate measurement unit to:
    count a first number of frames of a first frame size that are transported in frame-based transport in a given period of time,
    count a second number of frames of a second frame size that are transported in the frame-based transport in the given period of time, where the second frame size is different than the first frame size,
an encapsulation overhead determination unit to determine per frame encapsulation overhead in the frame-based transport as a function of the first frame rate, the first frame size, the second frame rate, and the second frame size,
where the function of the first frame rate, the first frame size, the second frame rate and the second frame size comprises the following:

$$encap\_overhead = \frac{(fs_2 * fr_2 * 8) - (fs_1 * fr_1 * 8)}{(fr_1 * 8) - (fr_2 * 8)}$$

where encap_overhead is the per frame encapsulation overhead,
    $fs_2$ is the second frame size in bytes,
    $fr_2$ is the second frame rate in frames per second,
    $fs_1$ is the first frame size in bytes, and
    $fr_1$ is the first frame rate in frames per second; and
a transport payload bandwidth determination unit to determine total transport bandwidth associated with the frame-based transport as a function of the first frame rate, the first frame size, the second frame rate, the second frame size, and the determined per frame encapsulation overhead.

13. The system of claim 12, where the network device comprises a switch.

14. The system of claim 13, where the switch is a multi-protocol label switching (MPLS) switch.

15. The system of claim 12, further comprising:
a control unit to send the determined per frame encapsulation overhead and the total transport bandwidth to a management system across a network.

16. The system of claim 12, where the function of the first frame rate, the first frame size, the second frame rate, the second frame size, and the encapsulation overhead comprises the following:

$$t\_bw = (fs_1 + encap\_overhead) * fr_1 * 8),$$

where t_bw is the total transport bandwidth.

17. The system of claim 12, where the function of the first frame rate, the first frame size, the second frame rate, the second frame size, and the encapsulation overhead comprises the following:

$$t\_bw = (fs_2 + encap\_overhead) * fr_2 * 8),$$

where t_bw is the total transport bandwidth.

18. A system, comprising:
means for measuring a frame rate, where the frame rate includes counting a first number of frames of a first frame size that are transported in frame-based transport via a network device in a given period of time and a second number of frames of a second frame size that are transported in the frame-based transport via the network device in the given period of time, where the second frame size is different than the first frame size;
means for determining per frame encapsulation overhead in the frame-based transport using the first frame rate, the first frame size, the second frame rate, and the second frame size,
where the per frame encapsulation overhead determining means includes:
    means for calculating the per frame encapsulation overhead in the frame-based transport using an equation that includes:

$$encap\_overhead = \frac{(fs_2 * fr_2 * 8) - (fs_1 * fr_1 * 8)}{(fr_1 * 8) - (fr_2 * 8)}$$

where encap_overhead is the per frame encapsulation overhead,
    $fs_2$ is the second frame size in bytes,
    $fr_2$ is the second frame rate in frames per second,
    $fs_1$ is the first frame size in bytes, and
    $fr_1$ is the first frame rate in frames per second; and
means for determining total transport bandwidth associated with the frame-based transport using the first frame rate, the first frame size, the second frame rate, the second frame size, and the determined per frame encapsulation overhead.

* * * * *